United States Patent [19]

Francesangeli et al.

[11] Patent Number: 6,114,952
[45] Date of Patent: Sep. 5, 2000

[54] DIAGNOSTIC COMMUNICATION INTERFACE UNIT FOR AN ADAPTIVE BRAKING SYSTEM

[75] Inventors: James E. Francesangeli, Cuyahoga; Craig S. Haehn, Lorain; Alfred L. Lancki; Marv Hamdan, both of Cuyahoga; Tim Frashure, Lorain, all of Ohio

[73] Assignee: AlliedSignal Truck Brake Systems Co., Elyria, Ohio

[21] Appl. No.: 09/031,810

[22] Filed: Feb. 27, 1998

[51] Int. Cl.[7] ........................................................... B60Q 1/00
[52] U.S. Cl. ........................... 340/453; 340/461; 340/687; 701/33; 701/34; 701/76
[58] Field of Search ...................................... 340/438, 453, 340/461, 687; 701/29, 33, 34, 71, 76

[56] References Cited

U.S. PATENT DOCUMENTS

| | | | |
|---|---|---|---|
| 4,098,542 | 7/1978 | Rajput et al. | 340/453 |
| 4,837,552 | 6/1989 | Vandemotter et al. | 340/461 |
| 5,541,840 | 7/1996 | Gurne et al. | 701/33 |
| 5,649,749 | 7/1997 | Kullmann et al. | 303/122.04 |
| 5,729,164 | 3/1998 | Pattantyus | 701/71 |
| 5,739,592 | 4/1998 | Rigsby et al. | 701/29 |
| 5,835,873 | 11/1998 | Darby et al. | 701/29 |

FOREIGN PATENT DOCUMENTS 2 217 029  10/1989  United Kingdom .
2 290 631  1/1996  United Kingdom .

OTHER PUBLICATIONS

J. Roquette, "Controle de L'ABS sur les Vehicles de la Gamme Volvo," *Revue Technique Diesel,* vol. 32, No. 191, pp. 17–37, Jan., 1995.

"Interface Circuit," *Research Disclosure,* No. 383, Mar., 1996, p. 203.

*Primary Examiner*—Daniel J. Wu

[57] ABSTRACT

A remote fault indicating unit (12) for an electronic system, such as a vehicle adaptive braking system, includes a series of visual indicators, such as light emitting diodes (50–59), on one surface of the housing and a computer serial port connector (13) for use when troubleshooting is done with a PC (18) equipped with the appropriate software. Each of the indicators (50–59) is activated in response to a predetermined malfunction sensed in the system, such as a defective speed sensor, defective modulator, or a defect in the electronic circuitry. The indicators (50–59) are reset with a switch (15) when the system is repaired. When the reset switch (15) is activated, all of the indicators (50–59) flash on and are then turned off. The reset switch (15) can also be activated for a longer period of time changing the ECU (14) configuration. A non-volatile RAM stores, in the ABS ECU (14), suspected problems sensed by the antilock system when the system is powered down, so that all malfunctions are again indicated immediately when the ABS is powered up.

15 Claims, 10 Drawing Sheets

DIAGNOSTIC COMMUNICATION INTERFACE UNIT FOR AN ADAPTIVE BRAKING SYSTEM

BACKGROUND OF THE INVENTION

1. Field of the Invention

This invention relates to a fault display and interface unit for a vehicle electronic control system, such as an adaptive braking system.

2. Description of Prior Art

Vehicle electronic control systems, such as adaptive braking systems, normally work quite well and are very reliable. However, because of the environmental and physical stresses to which components of these systems are subjected due to their being mounted in the adverse environment on the exterior of the vehicle, such systems occasionally malfunction. Many of these malfunctions are rather simple to correct. For example, a common malfunction is a shorted or open sensor or modulator fault, which may be caused by a broken wire, a connector being vibrated loose, etc. Such malfunctions are relatively simple for even a relatively untrained mechanic to correct. Furthermore, some malfunctions are intermittent. Since the warning device is activated only during such a malfunction the warning device is not activated until the malfunction occurs again. Accordingly, there is no easily accessible record of such a malfunction, so that even if the vehicle was serviced in the interim the defect probably would not have been either noted or corrected.

U.S. Pat. No. 4,837,552 discloses a unit where a series of light emitting diodes (LEDs) are provided on the housing within which the electronic control unit component of the system is mounted. The disclosure of U.S. Pat. No. 4,837,552 is incorporated herein by reference. In the unit disclosed in the patent each of the light emitting diodes is activated in response to a predetermined discrete fault in the system. For example, one of the light emitting diodes may be activated in response to a fault in one of the wheel speed sensors, and another of the light emitting diodes may be activated in response to a malfunction in one of the modulators. Accordingly, a relatively unskilled mechanic is able to examine the wires, connectors, etc. associated with the corresponding wheel speed sensor or modulator. If a broken wire is found or a loose connector is discovered, the mechanic can quickly repair the system, perhaps in the field, thereby saving valuable time that would ordinarily be required to send the vehicle to a maintenance location to perform more sophisticated diagnostic tasks. Of course, if the mechanic is unsuccessful in locating such a simple failure, or if the light emitting diode corresponding to a fault in, for example, the system logic controller is activated, the driver knows immediately that the vehicle must be taken to a maintenance location where a mechanic skilled in repairing electronic systems is available.

The faults sensed by the system and indicated on the light emitting diodes are stored in a non-volatile memory when the system is powered down. Once a malfunction occurs, the malfunction is stored in memory, and the corresponding indicator is activated upon system powerup at a later time. Accordingly, if a transient or intermittent failure does occur, the mechanic repairing the system will immediately know that such a fault has occurred at some time during the operation of the vehicle. However, the diagnostics LEDs have proven to be difficult to observe when installed in an obscure location on the vehicle framerail or reservoir.

SUMMARY OF THE INVENTION

The present invention is for a Diagnostic Communication Interface (DCI) Unit which contains diagnostics display LEDs and a rest function similar to those contained on the antilock ECUs described above and in addition contains a computer serial port connection for use in conjunction with a personal computer (PC). The DCI communicates with the integral mounted antilock ECU along a serial communications bus through the vehicle J1587 diagnostic connector which is located in the vehicle cab. The DCI is an electronic, diagnostic tool which can be used for interpreting and diagnosing antilock brake system faults. The DCI can be used either as a stand alone diagnostic tool or with Allied-Signal Truck Brake Systems Company's ACom software which is compatible with Microsoft's Windows software. The DCI can also be used in conjunction with other diagnostic software.

When used by itself the DCI is capable of locating individual antilock systems faults using a series of LEDs or lights that indicate the faulted device or its wiring and the location on the vehicle. The DCI has twelve lights and a reset switch. A row of ten lights is similar to the diagnostic LED display found on some prior art antilock controllers. The two other lights indicate that the DCI has a power source and that a communication link with the ECU is established.

When used in conjunction with a personal computer having installed a compatible diagnostic software such as the AlliedSignal Truck Brake Systems Company's ACom software, the DCI becomes a communications arbitrator between the vehicle's numerous onboard controllers and the personal computer. In this mode all testing and diagnostics are performed by the personal computer and the AlliedSignal Truck Brake Systems Company's ACom software or other compatible diagnostic software.

The DCI can be used both stand alone and with a PC, making the unit ideal for simple and more detailed Antilock Brake System (ABS) and Automatic Traction Control (ATC) trouble shooting. The disclosed system is also easily expandable and updated by PC software changes.

BRIEF DESCRIPTION OF DRAWINGS

For a better understanding of the invention refer to the preferred embodiments exemplary of the inventions shown in the accompanying drawings in which.

DETAILED DESCRIPTION OF THE PREFERRED EMBODIMENTS

Figure 1:
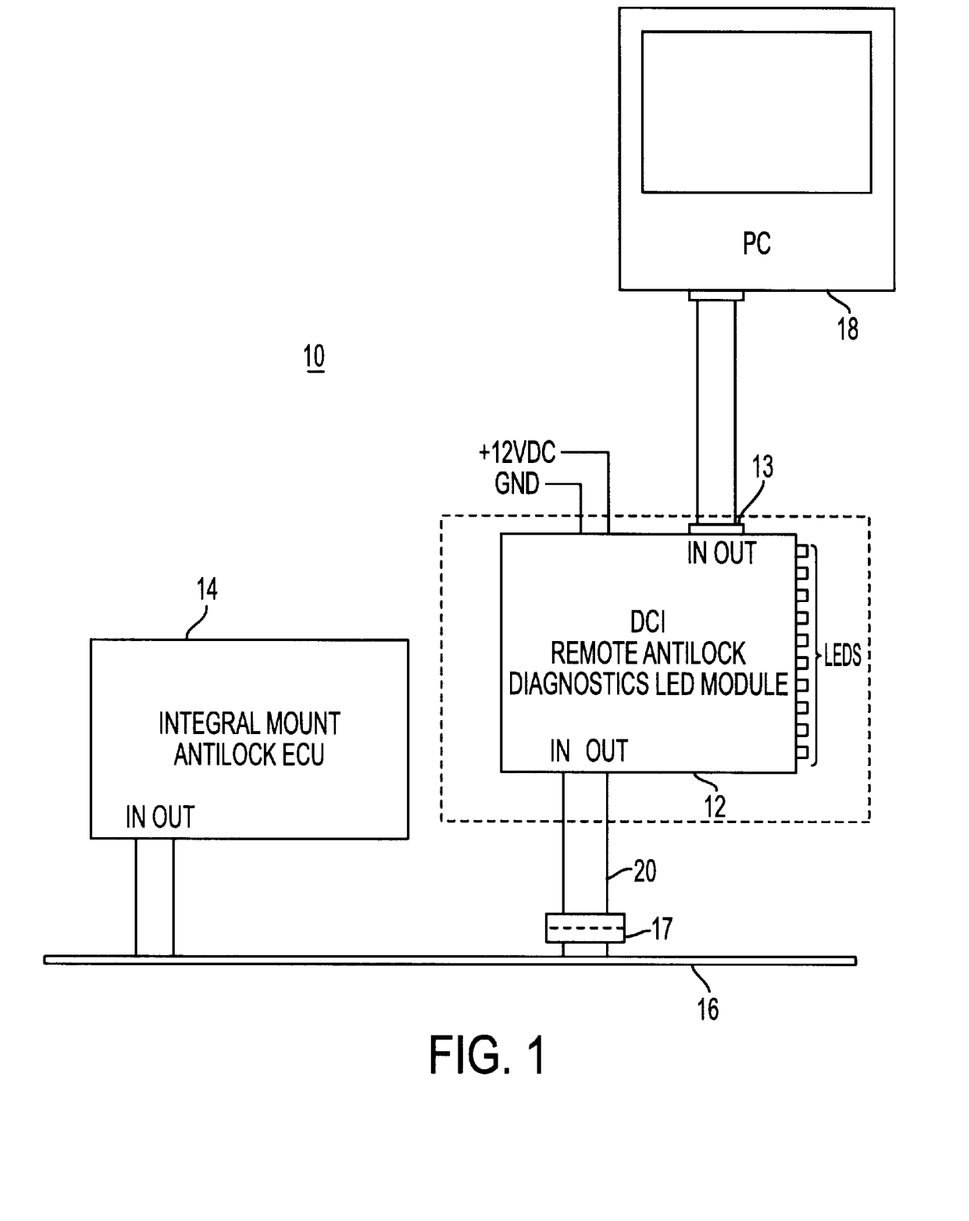
FIG. 1 is a diagrammatic illustration of a truck antilock diagnostic system using a diagnostic communications interface unit according to the present invention.

Referring now to the drawings and to FIG. 1 in particular there is shown a truck antilock diagnostic system 10 using a diagnostic communications interface unit 12 according to the present invention. An antilock electronic control unit (ECU) 14 is integrally mounted to a truck chassis on which the ABS and ATC is used. ECU 14 communicates with the DCI 12 along a serial bus 16. The serial bus 16 has a J1587 vehicle diagnostic connector to which a cable 20 from the DCI is connected. The DCI 12 includes a computer serial port connector 13 for connecting to a PC 18. The DCI has twelve LEDs. Ten of the LEDs provide a diagnostic check of the ABS/ATC and the other two LEDs are used to indicate that the DCI has a power source and that a communications link is established.

The ECU 14 which comprises a part of the larger electronic diagnostic system 10 is housed within an enclosure which is mounted on the truck chassis. The ECU 14 further includes ports for connection to vehicle speed sensors and adaptive braking pressure modulators. The speed sensors are normally wheel speed sensors mounted at the vehicle wheels. Such sensors are conventional, and provide a pulsed output which is transmitted to the ECU 14, the frequency of the pulses being proportional to wheel velocity. The ECU 14 processes the signals received from the speed sensors and generates output signals which control one or more brake pressure modulators. The brake pressure modulators are know in the art and are also conventional. The brake pressure modulators are adapted to decrease and thereafter increase braking pressure in response to impending wheel lockup conditions detected by the ECU 14 in response to the signals generated by the speed sensors.

ECU 14 also includes diagnostics which check the ECU 14, the modulators, wheel speed sensors, system voltage and optional traction control components and the speed sensors for faults. The ECU 14 logs these faults and broadcasts the fault status to the DCI 12 unit via the J1587 serial diagnostic link. In response to such faults, the DCI microcontroller 72 activates one or more of the LEDs, which are provided on the DCI 12 to indicate faults in the speed sensors, the modulators, or the ECU microprocessor 14. One or more discrete LEDs is provided for each of the possible faults detected, so that the mechanic servicing the vehicle can immediately tell, by examining the status of the LEDs on DCI 12 which of the components of the system is malfunctioning. Since many of the malfunctions sensed by the aforementioned diagnostics are of a transient or temporary nature, and which are eliminated when the system powers down upon vehicle shutoff, a non-volatile random access memory in the ECU 14 is provided to store the faults detected by the aforementioned diagnostics, so that upon powerup when the vehicle is started the same LEDs are again activated as were activated immediately before shut down and are transmitted to the DCI 12 unit. A reset switch 15, as shown in FIG. 2, on the DCI 12 is connected to reset the light emitting diodes when the vehicle has been serviced and the faults no longer exist.

Figure 2:
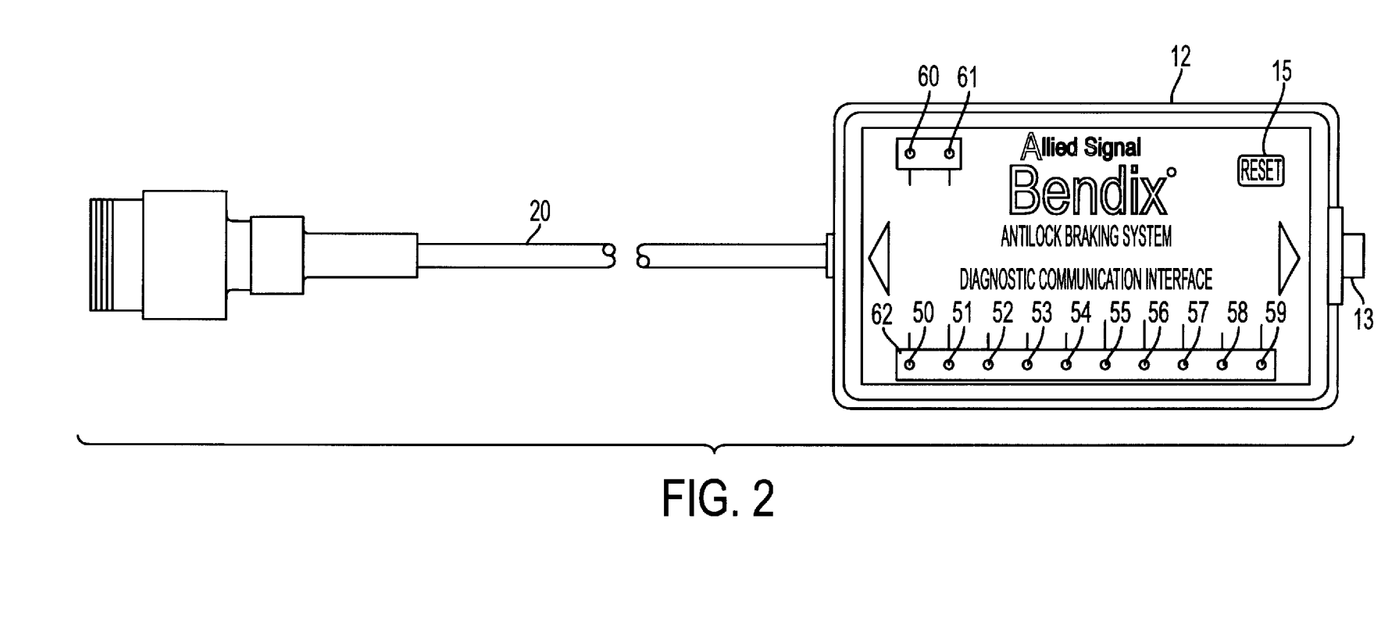
FIG. 2 is a front view of a DCI according to the present invention.
Figure 3:
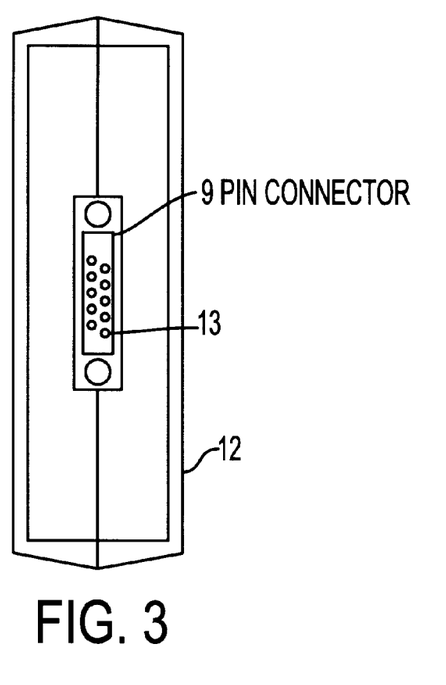
FIG. 3 is a side view of the DCI shown in FIG. 2.
Figure 4:
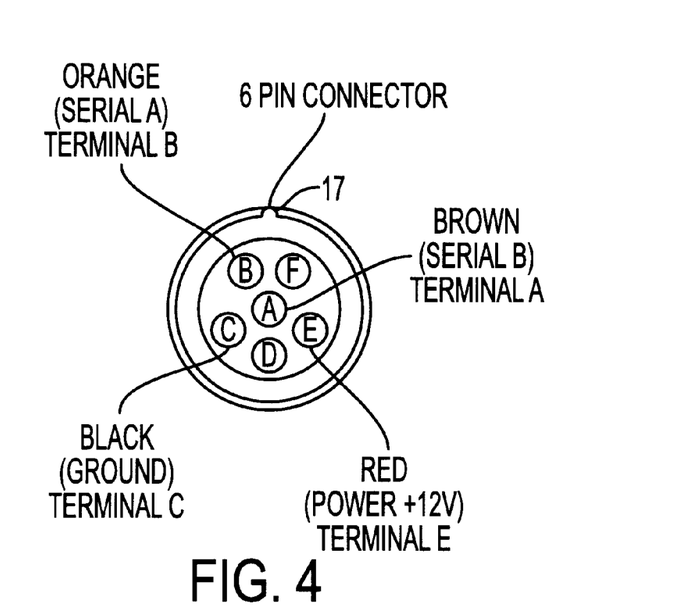
FIG. 4 is an end view of the connector to the DCI as shown in FIG. 2.

Referring now to FIGS. 2, 3 and 4 there is shown more detailed views of the DCI 12. The DCI 12 is an electronic, diagnostic tool for locating ABS and ATC faults. The DCI 12 has twelve lights 50 to 61 and a reset switch 15. The row of ten lights 50 to 59 is similar to the diagnostic LED display found on some prior art Bendix antilock controllers. Light 60 indicates power to the DCI 12 and light 61 indicates that communication with the vehicle antilock diagnostics is established. The first five lights 50 to 54 indicate the position of the suspected issue in the ABS. The next four lights 55 to 58 indicate an issue with a suspected component or its wiring. Light 59 indicates that there is the correct voltage at the ABS ECU.

The DCI 12 can be used either by itself or with Allied-Signal Truck Brake Systems Company's ACom software which is compatible with Microsoft's Windows software. The DCI 12 can also be used with other compatible diagnostic software. When used alone the DCI 12 is capable of locating individual antilock and traction control faults using the lights 50 to 59 that indicate the faulty device or its wiring and the location on the vehicle. When used in conjunction with a personal computer with the ACom software installed, the DCI becomes a communications arbitrator between the vehicle's numerous onboard controllers and the personal computer. The DCI 12 includes a computer serial port connector 13 for connecting to a PC. In this case all testing and diagnostics are performed by the personal computer and the ACom software. In order to use the DCI 12, the vehicle must be equipped with a J1587 diagnostic link connector 17. This connector is generally located on the drivers side, in a lower portion of the dash or under the dash panel.

To use the DCI 12 by itself the following procedure should be used for troubleshooting:

1. Park the vehicle on a level surface, apply the parking brake and turn off the ignition.
2. Locate the vehicle diagnostic connector 17 and connect the DCI cable 20 to the vehicle's diagnostic connector 17.
3. Turn the ignition on and note that the ten diagnostic lights 50 to 59 flash on and off as the system 10 goes through a self test.
4. The DCI lamps 50 to 61 that remain ON at the conclusion of the self test indicate the condition of the antilock brake system and the connection between the DCI 12 and the antilock controller 14.

For detailed instructions on the use of the diagnostic lamps on the DCI 12 a technician can consult the Service Data Sheets for the antilock controller being tested or the vehicle maintenance manual for troubleshooting information.

The procedure for using the DCI 12 with the ACom software installed on a PC 18 are as follows:

1. Park the vehicle on a level surface, apply the parking brake and turn off the ignition.
2. Locate the vehicle diagnostic connector 17 and connect the DCI cable 20 to the vehicle's diagnostic connector 17.
3. Connect the male end of a serial cable 20 to the DCI serial port 13.
4. With the PC 18 turned off, connect the other end of the serial cable to an unused serial port of the PC 18.
5. Turn the ignition on and note that the ten diagnostic lights 50 to 59 flash on and off as the system 10 goes through a self test.
6. Turn the computer 18 on then open the ACom software. Testing and troubleshooting of the ABS is performed by the PC 18 and the ACom software.

Figure 5:
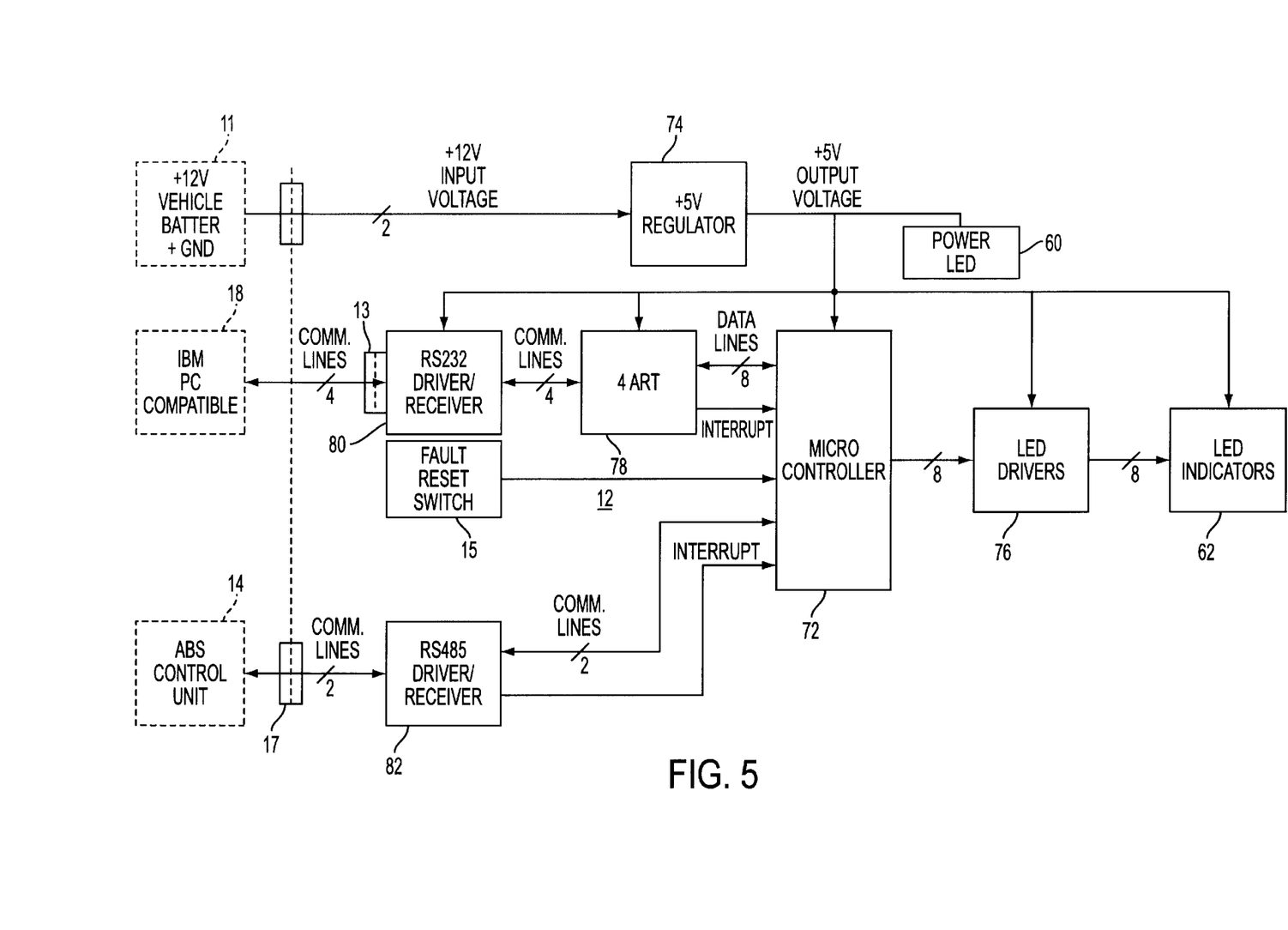
FIG. 5 is a block diagram showing the functional relationship of the DCI components; and, FIG. 6 is a detailed electrical schematic of the DCI.
Figure 6A:
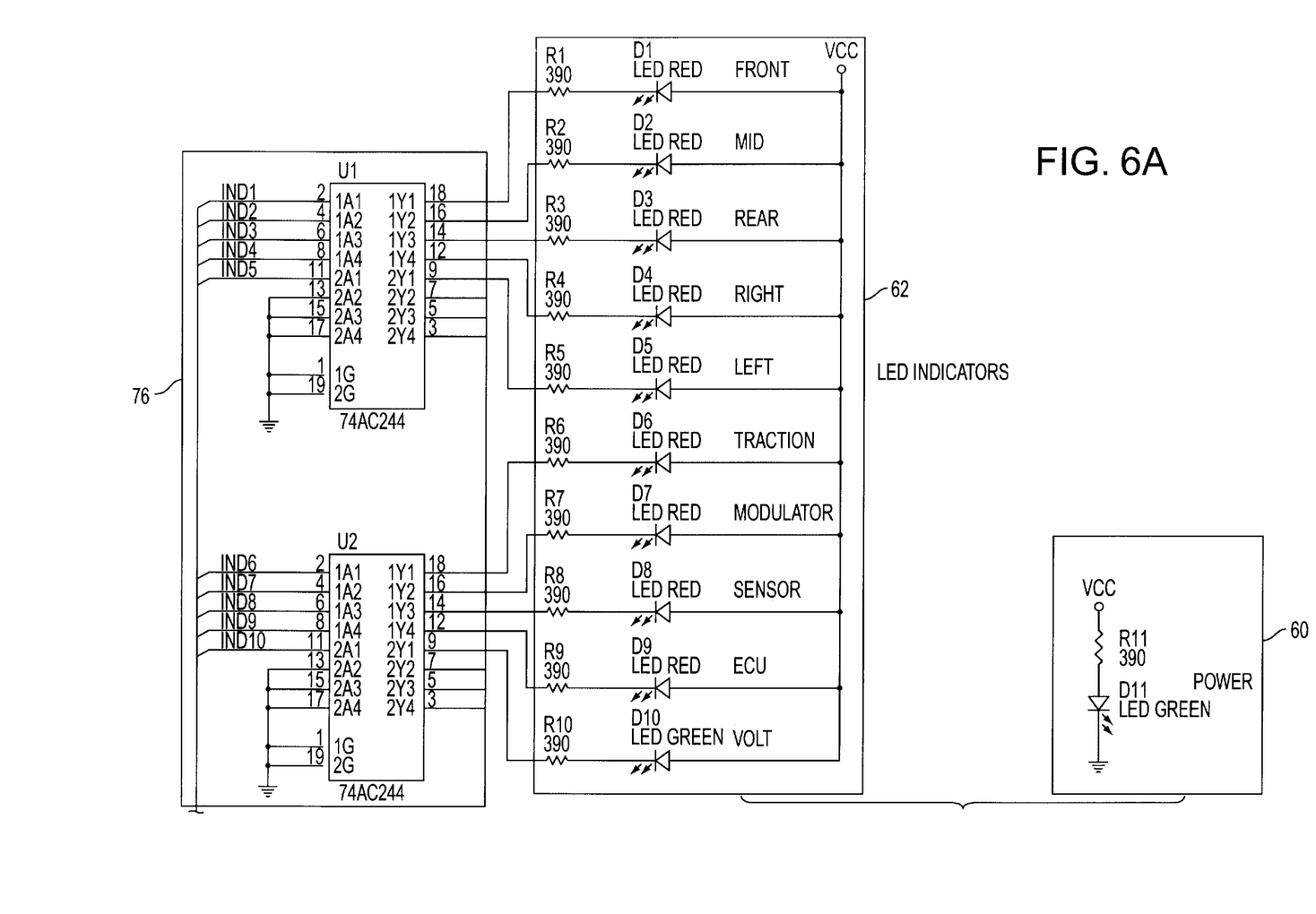
Figure 6B:
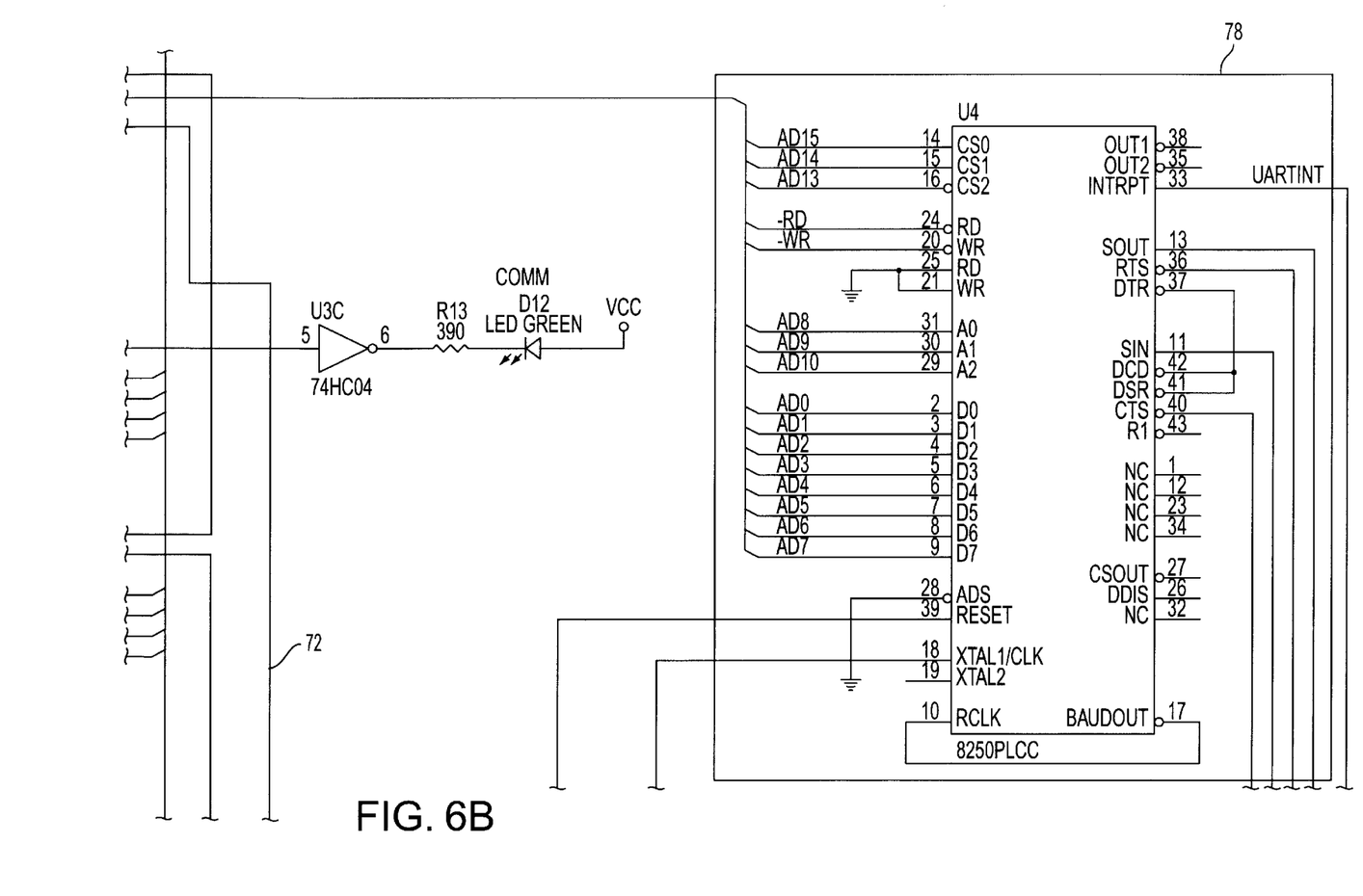
Figure 6C:
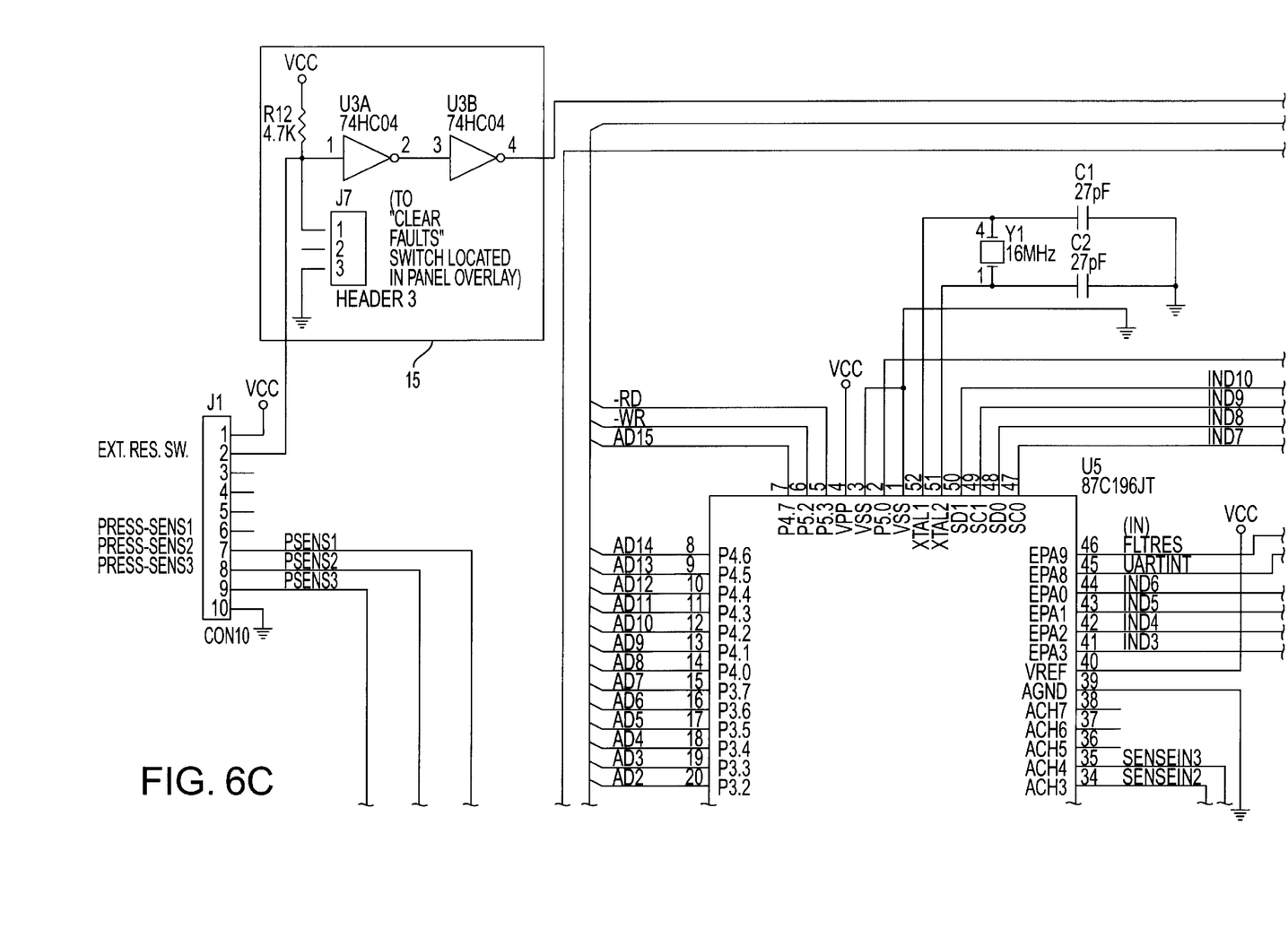
Figure 6D:
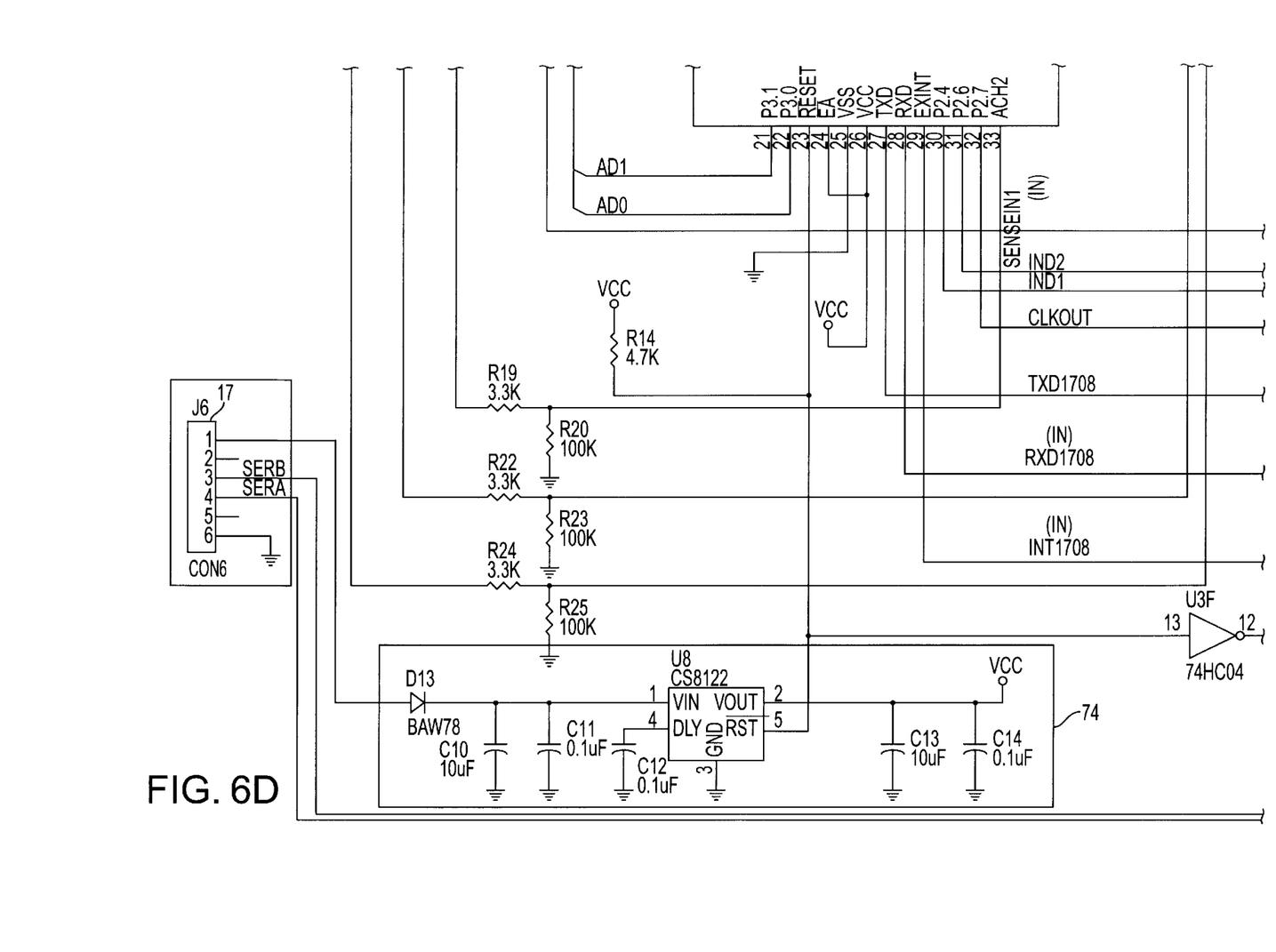
Figure 6E:
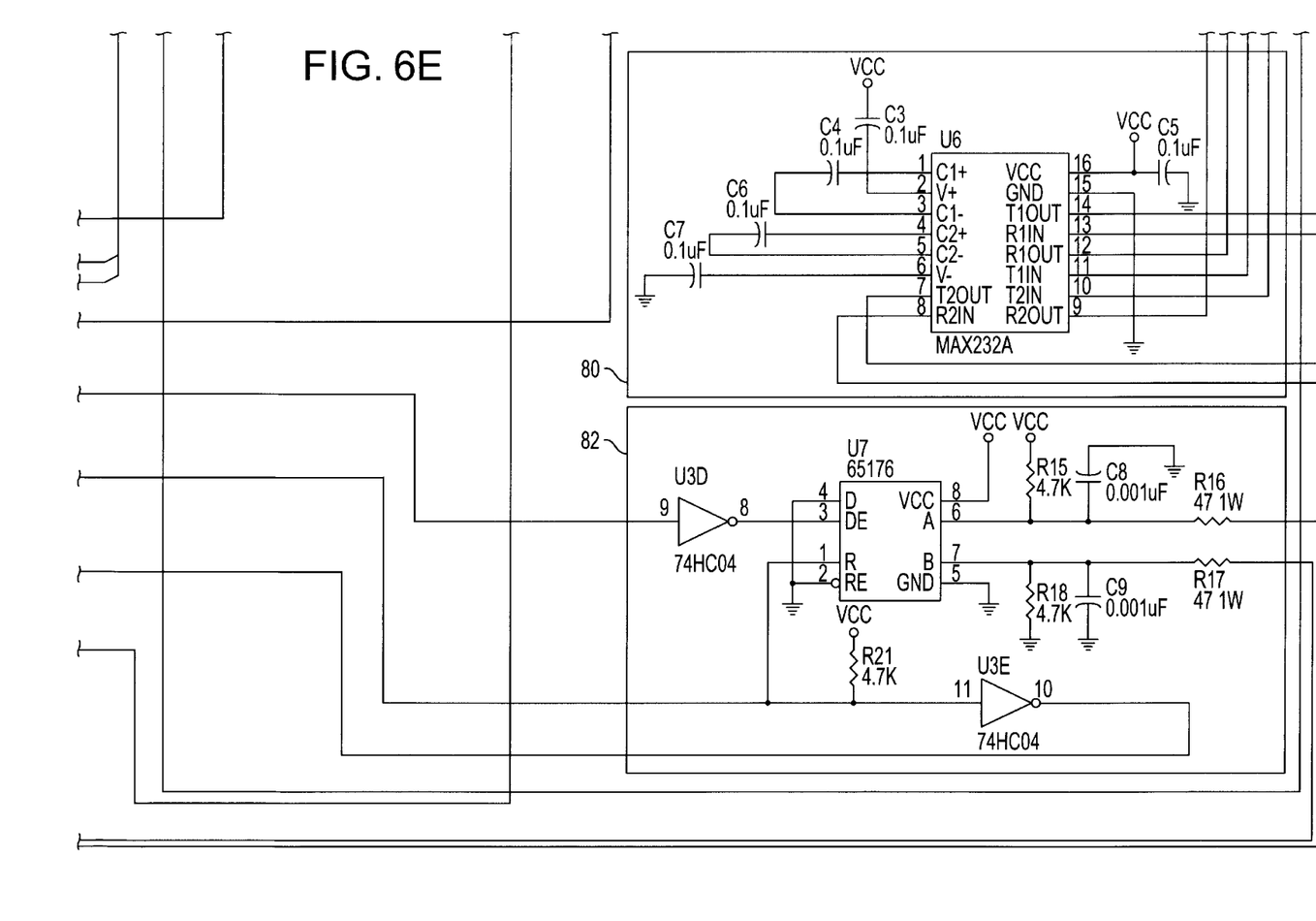
Figure 6F:
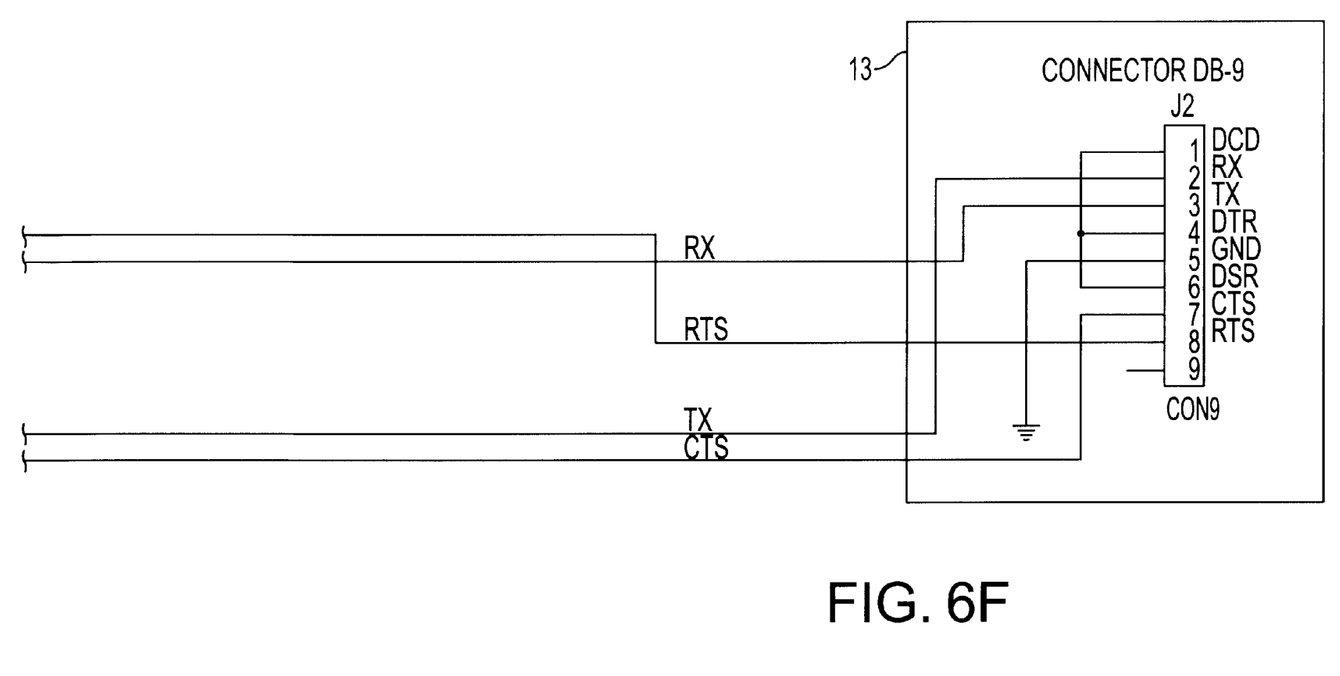

Referring now to FIG. 5 there is shown a block diagram showing the functional relationship of the various DCI 12 subsystems and components. In FIG. 6 there is shown a detailed electrical schematic of the DCI 12 with portions of the schematic marked to correspond to the functional blocks identified in FIG. 5. Power for the DCI 12 is from the vehicle battery 11. The vehicle battery 11 supplies +12 volt power, including a ground, through cable 20 to a +5 volt voltage regulator 74. Voltage regulator 74 provides a constant, smooth +5 volt output for the various components of DCI 12. The output of regulator 74 turns on LED 60 which provides a visual indication that there is power to DCI 12. The connection from battery 11 to voltage regulator 74 is through the J1587 connector 17. The vehicle ABS ECU 14 is also connected to the DCI 12 via the J1587 diagnostic link through connector 17.

The ABS ECU 14 communications information to a driver/receiver 82 in the DCI 12 via the J1587 link and the DCI connector 17. Driver/receiver 82 receives the messages from the ECU 14 and conditions the signals so they can be understood and processed by a DCI 12 microcontroller 72. Driver/receiver 82 also conditions the information signals which are transmitted from the microcontroller 72 to the ABS ECU 14 via the J1587 link. The driver/receiver 82 will generate and send an interrupt signal to microcontroller 72 when there is a message from the ECU 14. Microcontroller will react to the interrupt signal to read the information from driver/receiver 82 and communicate with the ECU 14. The microcontroller 72 receives the signals from driver/receiver 82 which are carried to driver/receiver 82 from the J1587 vehicle diagnostic bus. From the signal header, the microcontroller 72 recognizes and processes the ABS diagnostic communications. If there is an ABS fault the microcontroller 72 through an LED driver 76 activates particular LEDs 50 to 59 on the LED display 62 to identify the specific ABS fault. The ABS fault is displayed as a message on the LEDs 50 to 59 as described above. The LED driver 76 supplies drive current to turn on the appropriate LEDs which indicate the fault.

When a PC 18 is used with the DCI 12 it is connected to a serial port connector 13. Information to or from the PC 18 is not directly compatible with the microcontroller 72. A driver/receiver 80 and a uART 78 are disposed in the connection between the microcontroller 72 and the PC 18. Driver/receiver 80 converts information from the PC 18 to a digital recognizable serial format. The uART 78 reads the serial information which is stored in a register and converts the serial information to a parallel format signal which is readable and can be processed by the microcontroller 72. The driver/receiver 80 and the uART 78 also convert the information signals from microcontroller 72 to a format which is acceptable to the PC 18. The uART 78 will generate and send an interrupt signal to microcontroller 72 when there is a message from the PC 18. the microcontroller 72 will react to the interrupt signal to read the information from uART 78 and communicate with the PC 18. Based on the information received the microcontroller can act to send messages on the J1587 bus, turn on some of the LEDs or depending on the message received, do nothing. The DCI 12 can also take information from the J1587 bus and send it to the PC 18 to display. The uART 78 will convert the DCI microprocessor 72 information from a parallel form to a serial form and the driver/receiver 80 will condition the signals so they are acceptable to the PC 18. When the PC 18 is connected the LED display 62 continues to function to indicate ABS and ATC faults.

A fault reset switch 15 is used to send a clear message to the ECU 14 when an ABS fault is corrected. A momentary activation of switch 15 will turn off all of the LEDs 50 to 59 by clearing the current fault. If the ABS fault has been corrected the LEDs 50 to 59 will remain off. If an ABS fault is still present selected LEDs will come on to indicate the specific ABS faults. If the reset switch 15 is held down for an extended period, greater than 15 seconds, the DCI 12 will request the ECU 14 to perform a configuration event. This event is of self-configuration allows the ECU 14 to determine the number of sensor and traction control components connected to the system.

What is claimed is:

1. A diagnostic communication interface unit for use with a heavy vehicle having an antilock braking system, an integrally mounted antilock ECU and a J1587 serial communication bus connection, said diagnostic communication interface unit comprising:

a portable housing containing electrical circuit components;

a cable for connecting said housing to the J1587 serial bus connection for establishing a communication link between the circuit components in said housing and the antilock ECU;

a light mounted on said housing for indicating a communication link has been established between the circuit components in said housing and the antilock ECU;

a plurality of lights mounted on said housing and being responsive to the circuit components in said housing for indicating a fault in the antilock braking system; and, a PC serial port disposed on said portable housing for connecting to a PC and permitting when the PC is connected communication between the PC and the antilock ECU.

2. A diagnostic communication interface unit as claimed in claim 1 comprising:

signal conditioning means in said housing disposed between said PC and the antilock ECU for conditioning signals which are transmitted between said PC and the antilock ECU along the J1587 serial communication bus so that the signals received by said PC from the antilock ECU can be understood and processed by said PC and the signals received by the antilock ECU from said PC can be understood and processed by the antilock ECU.

3. A diagnostic communication interface unit as claimed in claim 1 comprising a reset switch mounted in said portable housing for resetting said plurality of lights to an OFF condition after a brake system fault has been repaired.

4. A diagnostic communication interface unit as claimed in claim 1 comprising a light mounted on said portable housing for indicating a communication link has been established between the circuit components in said housing and the antilock ECU.

5. A system for diagnosing a heavy truck ABS comprising:

an ECU;

a J1587 serial bus connected to said ECU;

a J1587 serial bus connection;

a diagnostic communication interface unit connected to said J1587serial bus connection and communicating through said J1587 serial bus with said ECU having a plurality of lights which use information from said ECU for indicating the status of the ABS; and, said diagnostic communication interface unit includes a PC serial port for connecting to a PC.

6. A system as claimed in claim 5 for diagnosing a heavy truck ABS comprising a PC connected to said PC serial port.

7. A system as claimed in claim 5 for diagnosing a heavy truck ABS wherein said diagnostic communication interface unit comprises a light for indicating a communication link has been established between said diagnostic communication interface unit and the antilock ECU.

8. A system as claimed in claim 7 for diagnosing a heavy truck ABS wherein said diagnostic communication interface unit comprises a reset switch mounted on said diagnostic communication interface unit for resetting said plurality of lights to an OFF condition after an antilock brake system fault has been repaired.

9. A diagnostic communication interface unit for use with a heavy vehicle having an antilock braking system, an integrally mounted antilock ECU and a diagnostic serial communication bus, said diagnostic communication interface unit comprising:

a portable housing containing a plurality of electrical circuit components;

a connection for connecting said portable housing to the diagnostic serial communication bus for establishing a communication link between the circuit components in said housing and the antilock ECU;

a plurality of lights mounted on said portable housing and being responsive to the circuit components in said housing for indicating a fault in the antilock braking system; and, a PC serial port disposed on said portable housing for connecting to a PC and permitting when the PC is connected communication between the PC and the antilock ECU.

10. A diagnostic communication interface unit as claimed in claim 9 comprising a reset switch mounted in said portable housing for resetting said plurality of lights to an OFF condition after an antilock brake system fault has been repaired.

11. A diagnostic communication interface unit as claimed in claim 10 comprising a light mounted on said portable housing for indicating a communication link has been established between the circuit components in said housing and the antilock ECU.

12. A diagnostic communication interface unit as claimed in claim 11 wherein said plurality of electrical circuit components comprise:

a microcontroller;

a driver/receiver disposed between said microcontroller and the antilock ECU for conditioning signals which are transmitted between said microcontroller and the antilock ECU along the diagnostic serial communication bus so that the signals received by said microcontroller from the antilock ECU can be understood and processed by said microcontroller and the signals received by the antilock ECU from said microcontroller can be understood and processed by the antilock ECU.

13. A diagnostic communication interface unit as claimed in claim 11 comprising:

signal conditioning means disposed between said microcontroller and the antilock ECU for conditioning signals which are transmitted between said microcontroller and the antilock ECU along the diagnostic serial communication bus so that the signals received by said microcontroller from the antilock ECU can be understood and processed by said microcontroller and the signals received by the antilock ECU from said microcontroller can be understood and processed by the antilock ECU.

14. A diagnostic communication interface unit as claimed in claim 13 comprising:

signal conditioning means disposed between said microcontroller and said PC for conditioning signals which are transmitted between said microcontroller and said PC so that the signals received by said microcontroller from said PC can be understood and processed by said microcontroller and the signals received by said PC from said microcontroller can be understood and processed by said PC.

15. A diagnostic communication interface unit as claimed in claim 9 comprising:

signal conditioning means disposed in said portable housing between said PC and the antilock ECU for conditioning signals which are transmitted between said PC and the antilock ECU along the diagnostic serial communication bus so that the signals received by said PC from the antilock ECU can be understood and processed by said PC and the signals received by the antilock ECU from said PC can be understood and processed by the antilock ECU.

* * * * *